UNITED STATES PATENT OFFICE.

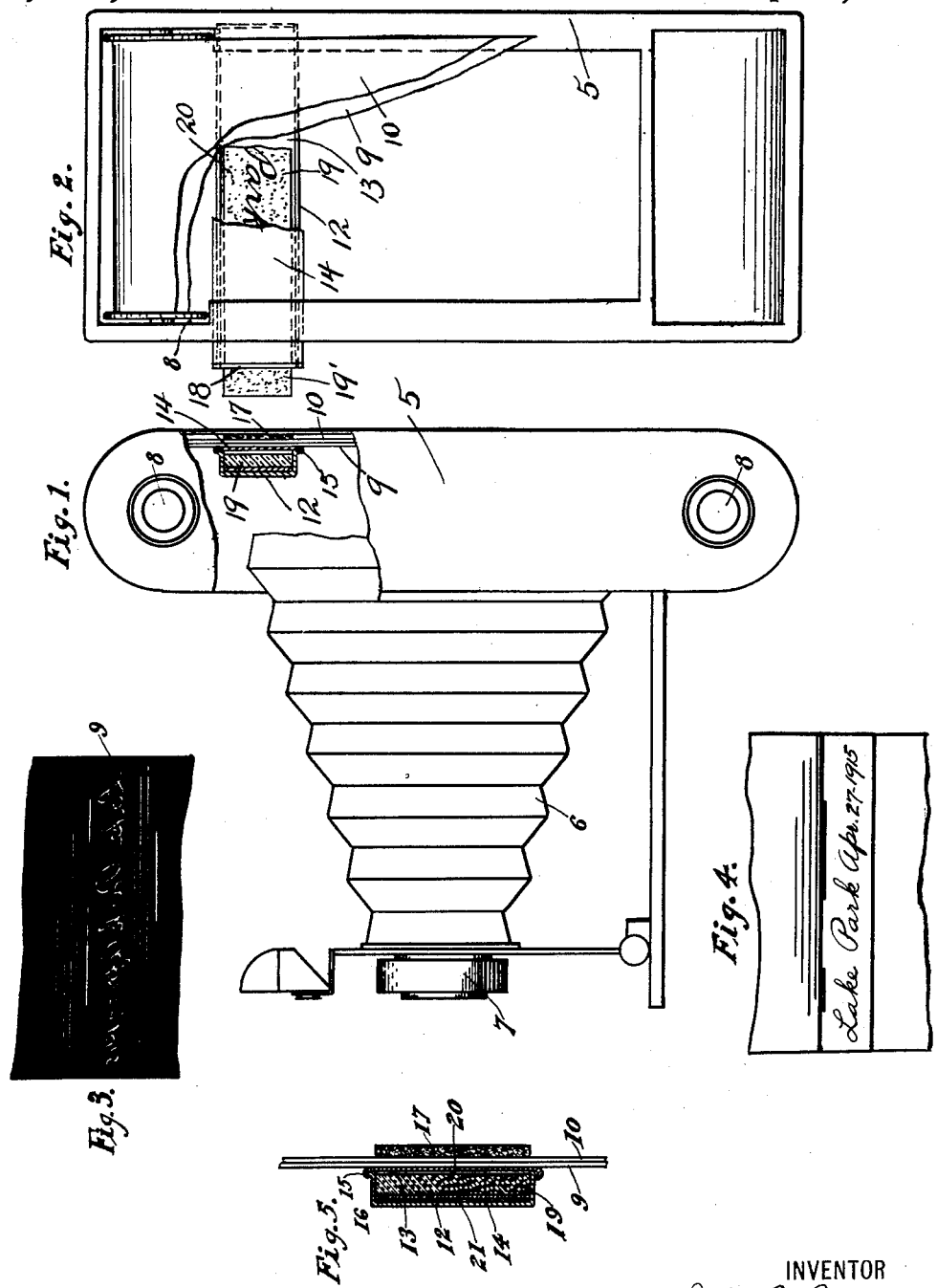

JOHN P. BETHKE, OF MILWAUKEE, WISCONSIN, ASSIGNOR OF ONE-HALF TO LOUIS SCHLESINGER, OF MILWAUKEE, WISCONSIN.

METHOD OF MAKING MARKINGS ON SENSITIZED MATERIAL.

1,375,814.  Specification of Letters Patent.  Patented Apr. 26, 1921.

Application filed December 11, 1916. Serial No. 136,151.

*To all whom it may concern:*

Be it known that I, JOHN P. BETHKE, a citizen of the United States, and resident of Milwaukee, in the county of Milwaukee and State of Wisconsin, have invented new and useful Improvements in Methods of Making Markings on Sensitized Material, of which the following is a description, reference being had to the accompanying drawings, which are a part of this specification.

The invention relates to the method of producing designating markings, such as autographs, inscriptions, drawings, etc., on sensitized photographic material such as a plate or film.

I am aware that designating markings have been applied to sensitized material by marking directly on the plate or film which is specially prepared for this purpose and that stenciling has been used to produce markings on the sensitized material but my method differs from these in that a medium carrying light obstructing markings is placed in a container and the markings reproduced on the sensitized photographic material while in the container, by light derived from a luminous source within or adjacent said container.

My method produces the markings in dark lines upon a light surface when printed from the negative.

My method permits of the easy production of markings on the ordinary sensitized photographic material within a camera.

One way of carrying my method into effect is shown and described in my co-pending application Serial No. 27,031, filed May 10, 1915, and in connection with the accompanying drawings in which:—

Figure 1 is a side view of a camera provided with the apparatus for carrying the method into effect, portions of the camera being broken away to show interior construction;

Fig. 2 is a rear view of a portion of the camera, parts being broken away to show the interior construction and portions of the device being shown as partly withdrawn from the camera;

Fig. 3 is a side view of a piece of developed film or negative with the markings produced thereon;

Fig. 4 is a side view of a portion of a print made from the negative; and

Fig. 5 is an enlarged transverse sectional view of the camera shown in connection with a portion of the sensitized material.

Referring to the drawings the numeral 5 indicates the camera case of an ordinary folding camera, 6 the bellows, 7 the lens casing, 8 the spools, and 9 the sensitive photographic material, film or negative sheet which is unrolled from one spool and wound on the other though it will be understood that the method may be carried out in connection with any suitable sensitized material container using films or plates. In the present instance the roll film is provided as usual with a protecting roll of black paper 10 which is mounted on the spools and moves with the film on the outer side thereof.

The device illustrated in the accompanying drawing for carrying the method into effect consists of an elongated box or casing 12 having an open side 13 covered by a slidable cover 14, said container being positioned within the camera or container so that the open side 13 is disposed adjacent the sensitized side of the ordinary plate or film. The cover has its side edge portions 15 bent over to engage the flanged side edge portions 16 of the box and form a light proof closure therefor.

The elongated box is mounted within the lower portion of the camera casing and extends transversely across and adjacent to the inner face of the rear wall of the camera casing as previously described.

The sensitized film 9 and its backing 10 travel between the box 12 and the rear wall of the camera casing, and a bed of material 17 mounted on the rear wall of the container adjacent the box serves to cause the film to travel closely to the cover of the box. One end of the cover 14 of the box projects through one side portion of the camera or container and is provided with a bent end portion 18 so that said cover may be easily engaged and pulled outwardly to open the box.

Within the box is positioned an elongated piece of transparent or translucent material 19 which may be written upon as indicated in Fig. 2 with a lead pencil or other marking device. I preferably use a strip of glass having its outer face 20 ground or frosted as indicated in Fig. 2 to permit writing thereon with an ordinary lead pencil, and which writing may be easily removed with a rubber eraser. While I preferably use ground glass the same results may be obtained by the use of celluloid or other translucid material.

The inner face of the glass is coated with a luminous paint 21 or other material which will give or radiate light to act upon the sensitized material when within the box and the box cover is in open position. Instead of writing the characters on the translucid material the characters may be written directly upon the luminous paint with which the translucid material is coated.

The elongated writing strip, or in substance a positive, occupies substantially the entire space within the box and one end 19′ projects from the same side of the camera or container as the box cover and may be pulled outwardly from the box and the casing as indicated in Fig. 2.

While no special means have been shown or described for forming light proof joints between the camera casing and the slidable box cover and writing medium it is to be understood that all joints may be made light proof in any manner desired.

The method of producing the markings is as follows: The strip of glass or writing surface is moved to such a position with respect to the camera or container as to permit the marking thereon of the desired characters. In the construction shown the writing material is withdrawn from the box 12 and from the side of the camera casing a sufficient distance to permit the user to make opaque markings, such as the name and date or other data upon the surface with a marking device such as an ordinary lead pencil and while writing, the luminous paint on the other side of the glass will be exposed to and absorb light. When the marking or writing is completed the writing surface is brought into position adjacent the sensitized material and exposed and in the construction described this is done by returning the strip of glass to its position within the box and the box cover is pulled out a sufficient distance to uncover the writing for two or three seconds. While the cover is in open position the light from the luminous paint will shine through the glass and upon the portion of the film in front of the glass which is not covered by the writing. When the desired exposure has been made the cover is replaced and further light to the sensitized material is excluded and the writing surface may then be moved so as to erase the markings upon it. This exposure will, after the sensitized material is developed, reproduce the writing in transparent lines on a dark back ground as shown in Fig. 3 and in printing from the film or negative the writing will be reproduced in positive form or black upon a white back ground as shown in Fig. 4.

The terms and expressions employed in the foregoing description and in the appended claims and the accompanying drawings are used for the purpose of description and not of limitation, both as to use of apparatus and mode of operation of carrying my method into practice, it not being my intention to exclude from the scope of my invention any method equivalent for that shown in the illustration and described or any modification in the manipulation of my invention which consists in marking or writing upon a writing surface, positioning the surface in a container so that it is adjacent the sensitized material so that the markings will intercept the rays of light passing from the luminous or phosphorescent medium and exposing the sensitized material to this light to reproduce the marking upon it.

What I claim as my invention is:

1. The method of placing designating markings on a sensitized element while in a camera, by means of a phosphorescent medium within the camera, and a translucent element having a writing surface bearing light obstructing characters thereon, which consists in interposing the writing element with the characters thereon between the sensitized element and the phosphorescent medium and exposing said sensitized element to the light rays emanating from said phosphorescent medium.

2. The method of placing designating markings on a sensitized element while in a camera, by means of a phosphorescent element having a writing surface also within the camera, which consists in interposing the writing surface portion of the phosphorescent element with the characters thereon between the sensitized element and the phosphorescent portion of the phosphorescent element and making the exposure.

3. The method of placing designating markings on a sensitized element while in a camera, by means of a contained phosphorescent source of light within the camera and a translucid element having a writing surface, which consists in making substantially opaque markings on the writing surface of the translucent element, positioning the surface portion of the translucent element so marked between the contained phosphorescent source of light and the sensitized element and making the exposure.

4. The method of placing designating markings on a sensitized element while in a camera, by means of a contained phosphorescent source of light and an element having a writing surface, which consists in making erasable substantially opaque markings on the writing surface of the element, and positioning the surface of the element so marked between the contained phosphorescent source of light and the sensitized material and making the exposure.

5. The method of placing designating markings on a sensitized element while in a camera, by means of a phosphorescent medium within the camera and a translucent element having a writing surface bearing light obstructing characters thereon, which consists in marking opaque characters on the writing surface of the translucent element and exposing the phosphorescent medium to a source of light, positioning the surface of the translucent element so marked between the phosphorescent medium and the sensitized element and making the exposure.

6. The method of placing designating markings on a sensitized surface of an element while within a camera, which consists in forming the inscription in light obstructing characters upon the surface of a member, placing the inscribed member within a camera in printing position adjacent the sensitized surface of the element and exposing the sensitized surface surrounding the characters to be printed to the action of rays emitted from a phosphorescent actinic ray emitting medium and then developing the sensitized surface.

7. The herein described method of placing an inscription upon a sensitized medium, which consists in forming the desired inscription in light obstructing characters upon the surface of a medium provided with an actinic ray emitting coating, and placing said inscription bearing medium adjacent said sensitive medium in position to print the inscription upon said sensitive medium by the action of the emitted rays.

In testimony whereof I affix my signature.

JOHN P. BETHKE.